US012770418B2

(12) United States Patent
Ikuta

(10) Patent No.: US 12,770,418 B2
(45) Date of Patent: Oct. 20, 2026

(54) DIGITAL DATA TAGGING APPARATUS, TAGGING METHOD, PROGRAM, AND RECORDING MEDIUM

(71) Applicant: FUJIFILM Corporation, Tokyo (JP)

(72) Inventor: Mayuko Ikuta, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 312 days.

(21) Appl. No.: 18/468,410

(22) Filed: Sep. 15, 2023

(65) Prior Publication Data

US 2024/0005683 A1 Jan. 4, 2024

Related U.S. Application Data

(63) Continuation of application No. PCT/JP2022/014779, filed on Mar. 28, 2022.

(30) Foreign Application Priority Data

Mar. 31, 2021 (JP) ................................ 2021-059304

(51) Int. Cl.
*G06T 7/50* (2017.01)
*G06V 20/70* (2022.01)
(Continued)

(52) U.S. Cl.
CPC .......... *G06V 20/70* (2022.01); *G10L 15/1822* (2013.01); *G10L 15/26* (2013.01); *G10L 2015/088* (2013.01)

(58) Field of Classification Search
USPC ........................................................ 382/195
See application file for complete search history.

(56) References Cited

U.S. PATENT DOCUMENTS

2010/0332226 A1* 12/2010 Lee ......................... G10L 15/26 704/E15.044
2013/0088499 A1 4/2013 Sato et al.
2013/0346068 A1* 12/2013 Solem ..................... G10L 15/26 704/9

FOREIGN PATENT DOCUMENTS

JP 11337357 A * 12/1999
JP H11337357 A 12/1999
(Continued)

OTHER PUBLICATIONS

International Preliminary Report on Patentability (Chapter I) and Written Opinion of the International Searching Authority issued in PCT/JP2022/014779; issued Oct. 3, 2023.
(Continued)

*Primary Examiner* — Jacky X Zheng
(74) *Attorney, Agent, or Firm* — Studebaker Brackett PLLC

(57) ABSTRACT

It is possible for a user to easily assign a desired tag by using a voice, regardless of homonyms and synonyms having different expressions. In a digital data tagging apparatus, a tagging method, a program, and a recording medium according to an embodiment of the present invention, a digital data acquisition unit acquires digital data to which a tag is assigned, and an audio data acquisition unit acquires audio data related to the digital data. A word/phrase extraction unit extracts a word/phrase from the audio data, a tag candidate determination unit determines one or more tag candidates of which a degree of association with the word/phrase is equal to or more than a first threshold value from among a plurality of tag candidates, which are stored in advance in a tag candidate storage unit, as a first tag candidate, and a tag assignment unit assigns at least one of a tag candidate group including the word/phrase and the first tag candidate to the digital data as the tag.

21 Claims, 8 Drawing Sheets

(51) Int. Cl.

| | |
|---|---|
| ***G10L 15/18*** | (2013.01) |
| ***G10L 15/26*** | (2006.01) |
| *G10L 15/08* | (2006.01) |

(56) References Cited

FOREIGN PATENT DOCUMENTS

| | | | | | |
|---|---|---|---|---|---|
| JP | 2006-301757 | A | | 11/2006 | |
| JP | 2008-268985 | A | | 11/2008 | |
| JP | 2009009461 | A | * | 1/2009 | |
| JP | 2010-218371 | A | | 9/2010 | |
| JP | 2011-008869 | A | | 1/2011 | |
| JP | 2012069062 | A | * | 4/2012 | |
| JP | 2013084074 | A | * | 5/2013 | ......... G06F 16/9027 |
| JP | 6512750 | B2 | | 5/2019 | |
| JP | 2020-079982 | A | | 5/2020 | |

OTHER PUBLICATIONS

International Search Report issued in PCT/JP2022/014779; mailed Jun. 14, 2022.

An Office Action, "Notice of Reasons for Refusal," mailed by the Japanese Patent Office on Nov. 18, 2025, which corresponds to Japanese Patent Application No. 2023-511218 and is related to U.S. Appl. No. 18/468,410; with English language translation.

* cited by examiner

DIGITAL DATA TAGGING APPARATUS, TAGGING METHOD, PROGRAM, AND RECORDING MEDIUM

CROSS-REFERENCE TO RELATED APPLICATIONS

This application is a Continuation of PCT International Application No. PCT/JP2022/014779 filed on Mar. 28, 2022, which claims priority under 35 U.S.C. § 119(a) to Japanese Patent Application No. 2021-059304 filed on Mar. 31, 2021. The above applications are hereby expressly incorporated by reference, in their entirety, into the present application.

BACKGROUND OF THE INVENTION

1. Field of the Invention

The present invention relates to a tagging apparatus that assigns a tag to digital data, a tagging method, a program, and a recording medium.

2. Description of the Related Art

In the related art, a tagging apparatus that extracts a word/phrase from audio data and assigns the word/phrase extracted from the audio data as a tag has been known (see JP2020-079982A, JP2008-268985A, and JP6512750B).

SUMMARY OF THE INVENTION

However, in the tagging apparatus in the related art that uses the audio data, there is a problem that it is difficult to discriminate homonyms. For example, in a case in which the word/phrase "Zou" is included in a Japanese voice, it is difficult to discriminate whether this "Zou" is "Zou" that means "elephant" or "Zou" that means "statue". Even in an English voice, it is difficult to discriminate whether the uttered word/phrase means "ant" or "aunt".

In addition, in the tagging apparatus in the related art, there are many synonyms having different expressions. Therefore, in a case in which these synonyms are assigned as the tags as they are, there is a problem that it is difficult to perform a search using the tags. For example, synonyms for "sanpo" (meaning walk) in Japanese include "osanpo", "burabura", "sansaku", and the like. Therefore, in a search using "sanpo", "sanpo" and "osanpo" are searched, but "burabura" and "sansaku" were not searched. In English as well, synonyms for "walk" include "stroll", "ramble", and the like. Therefore, in a search using "walk", "walk" and "walking" are searched, but "stroll" and "ramble" are not searched.

The present invention is to provide a digital data tagging apparatus, a tagging method, a program, and a recording medium which make it possible for a user to easily assign a desired tag by using a voice regardless of homonyms and synonyms having different expressions.

In order to achieve the object described above, an aspect of the present invention provides a digital data tagging apparatus comprising a processor, and a tag candidate memory that stores a plurality of tag candidates in advance, in which the processor is configured to: acquire digital data to which a tag is assigned; acquire audio data related to the digital data; extract a word/phrase from the audio data; determine one or more tag candidates of which a degree of association with the word/phrase is equal to or more than a first threshold value from among the plurality of tag candidates as a first tag candidate; and assign at least one of a tag candidate group including the word/phrase and the first tag candidate to the digital data as the tag.

Here, it is preferable that the digital data tagging apparatus further comprises a display, in which the processor is configured to: convert the audio data into text data to extract one or more words/phrases from the text data; display a text corresponding to the text data on the display; determine the first tag candidate based on a word/phrase selected by a user from among the one or more words/phrases included in the text displayed on the display; display the tag candidate group on the display; and assign at least one selected by the user from the tag candidate group displayed on the display to the digital data as the tag.

In addition, it is preferable that the processor is configured to include a first synonym of which a degree of similarity in pronunciation to the word/phrase is equal to or more than the first threshold value among synonyms of the word/phrase in the first tag candidate.

In addition, it is preferable that the processor is configured to include a second synonym of which a degree of similarity in meaning to the word/phrase is equal to or more than the first threshold value among synonyms of the word/phrase in the first tag candidate.

In addition, it is preferable that the processor is configured to include a first synonym of which a degree of similarity in pronunciation to the word/phrase is equal to or more than the first threshold value and a second synonym of which a degree of similarity in meaning to the word/phrase is equal to or more than the first threshold value among synonyms of the word/phrase in the first tag candidate.

In addition, it is preferable that the processor is configured to determine the number of the first synonyms and the number of the second synonyms to be included in the first tag candidate such that the number of the first synonyms is larger than the number of the second synonyms.

In addition, it is preferable that the processor is configured to include a homonym of the word/phrase in the first tag candidate.

In addition, it is preferable that the processor is configured to display a word/phrase or a tag candidate, which is previously selected by the user, from the tag candidate group with higher priority than a word/phrase or a tag candidate, which is not previously selected by the user.

In addition, it is preferable that the processor is configured to display a word/phrase or a tag candidate, which is previously selected many times, among the words/phrases or the tag candidates, which are previously selected by the user, with higher priority than a word/phrase or a tag candidate, which is previously selected few times.

In addition, it is preferable that the digital data is image data, and the processor is configured to: recognize a subject included in an image corresponding to the image data; determine a word/phrase, which represents a name of the subject corresponding to the word/phrase and is different from the word/phrase, as a second tag candidate; and display the second tag candidate on the display by including the second tag candidate in the tag candidate group.

In addition, it is preferable that the digital data is image data, and the processor is configured to: recognize at least one of a subject or a scene included in an image corresponding to the image data; and in a case in which there are a predetermined number or more of the tag candidates of which the degree of association with the word/phrase is equal to or more than the first threshold value among the plurality of tag candidates, determine only a tag candidate of which a degree of association with at least one of the subject or the scene is equal to or more than a second threshold value from among the predetermined number or more of the tag candidates as the first tag candidate.

In addition, it is preferable that the digital data is image data, and the processor is configured to: recognize at least one of a subject or a scene included in an image corresponding to the image data; determine a tag candidate of which a degree of association with at least one of the subject or the scene is equal to or more than a second threshold value and a degree of similarity of pronunciation to the word/phrase is equal to or more than a third threshold value, from among the plurality of tag candidates as a third tag candidate; and display the third tag candidate on the display by including the third tag candidate in the tag candidate group.

In addition, it is preferable that the digital data is image data, and a person tag, which represents a name of a subject included in an image corresponding to the image data, is assigned to the image data by a first user, and the processor is configured to: recognize the subject included in the image; extract the name of the subject from audio data including a voice of a second user who is different from the first user and utters the name of the subject for the image; determine one or more tag candidates of which a degree of association with the name of the subject is equal to or more than the first threshold value as the first tag candidate to determine the person tag as a fourth tag candidate in a case in which the first tag candidate and the person tag are different from each other; and display the fourth tag candidate on the display by including the fourth tag candidate in the tag candidate group.

In addition, it is preferable that the digital data is image data, and the processor is configured to: acquire information on an imaging position of an image corresponding to the image data; determine a tag candidate, which represents a place name that is located within a range equal to or less than a fourth threshold value from the imaging position of the image and has a degree of similarity of pronunciation to the word/phrase being equal to or more than a third threshold value, from among the plurality of tag candidates as a fifth tag candidate based on the information on the imaging position of the image; and display the fifth tag candidate on the display by including the fifth tag candidate in the tag candidate group.

In addition, it is preferable that the digital data is image data, and the processor is configured to: recognize a subject included in an image corresponding to the image data; acquire information on an imaging position of the image; extract a name of the subject from audio data including the name of the subject included in the image; in a case in which the name of the subject and an actual name of the subject located within a range equal to or less than a fourth threshold value from the imaging position of the image are different from each other, determine the actual name of the subject as a sixth tag candidate based on the information on the imaging position of the image; and display the sixth tag candidate on the display by including the sixth tag candidate in the tag candidate group.

In addition, it is preferable that the processor is configured to: in a case in which the sixth tag candidate is selected by the user from the tag candidate group including the sixth tag candidate displayed on the display for one image data, for each of a plurality of image data corresponding to a plurality of images captured within a predetermined period, determine an actual name corresponding to a subject included in each of the plurality of images as a seventh tag candidate; and assign the seventh tag candidate corresponding to each of the plurality of image data to each of the plurality of image data as the tag.

In addition, it is preferable that the processor is configured to: extract a place name from audio data including the place name; in a case in which there are a plurality of locations of the place name, determine a tag candidate consisting of a combination of the place name and each of the plurality of locations as an eighth tag candidate; and display the eighth tag candidate on the display by including the eighth tag candidate in the tag candidate group.

In addition, it is preferable that the processor is configured to: extract at least one of a sound onomatopoeic word or a voice onomatopoeic word corresponding to an environmental sound included in the audio data from the audio data; determine at least one of the sound onomatopoeic word or the voice onomatopoeic word as a ninth tag candidate; and display the ninth tag candidate on the display by including the ninth tag candidate in the tag candidate group.

In addition, it is preferable that the digital data tagging apparatus further comprises an audio data memory that stores the audio data, in which the processor is configured to store the audio data having information on association with the digital data in the audio data memory.

In addition, it is preferable that the digital data is moving image data, and the processor is configured to extract the word/phrase from audio data included in the moving image data.

In addition, another aspect of the present invention relates to a tagging method comprising: a step of acquiring digital data to which a tag is assigned via a digital data acquisition unit; a step of acquiring audio data related to the digital data via an audio data acquisition unit; a step of extracting a word/phrase from the audio data via a word/phrase extraction unit; a step of determining one or more tag candidates of which a degree of association with the word/phrase is equal to or more than a first threshold value from among a plurality of tag candidates, which are stored in advance in a tag candidate storage unit, as a first tag candidate via a tag candidate determination unit; and a step of assigning at least one of a tag candidate group including the word/phrase and the first tag candidate to the digital data as the tag via a tag assignment unit.

In addition, still another aspect of the present invention provides a program for causing a computer to execute each of the steps of the tagging method described above.

In addition, still another aspect of the present invention provides a computer-readable recording medium on which a program for causing a computer to execute each of the steps of the digital data tagging method described above is recorded.

In the aspects of the present invention, the word/phrase is extracted from the audio data, the tag candidate of which the degree of association with the word/phrase is high is determined from among the plurality of tag candidates, which are stored in advance, as the first tag candidate, and at least one of the tag candidate group including the word/phrase and the first tag candidate is assigned to the digital data as the tag. Therefore, according to the aspects of the present invention, it is possible for the user to easily assign the desired tag to the digital data by using the audio data, regardless of the homonyms and the synonyms having different expressions.

DESCRIPTION OF THE PREFERRED EMBODIMENTS

Hereinafter, a digital data tagging apparatus, a tagging method, a program, and a recording medium according to an embodiment of the present invention will be described based on preferred embodiments shown in the accompanying drawings.

Figure 1:
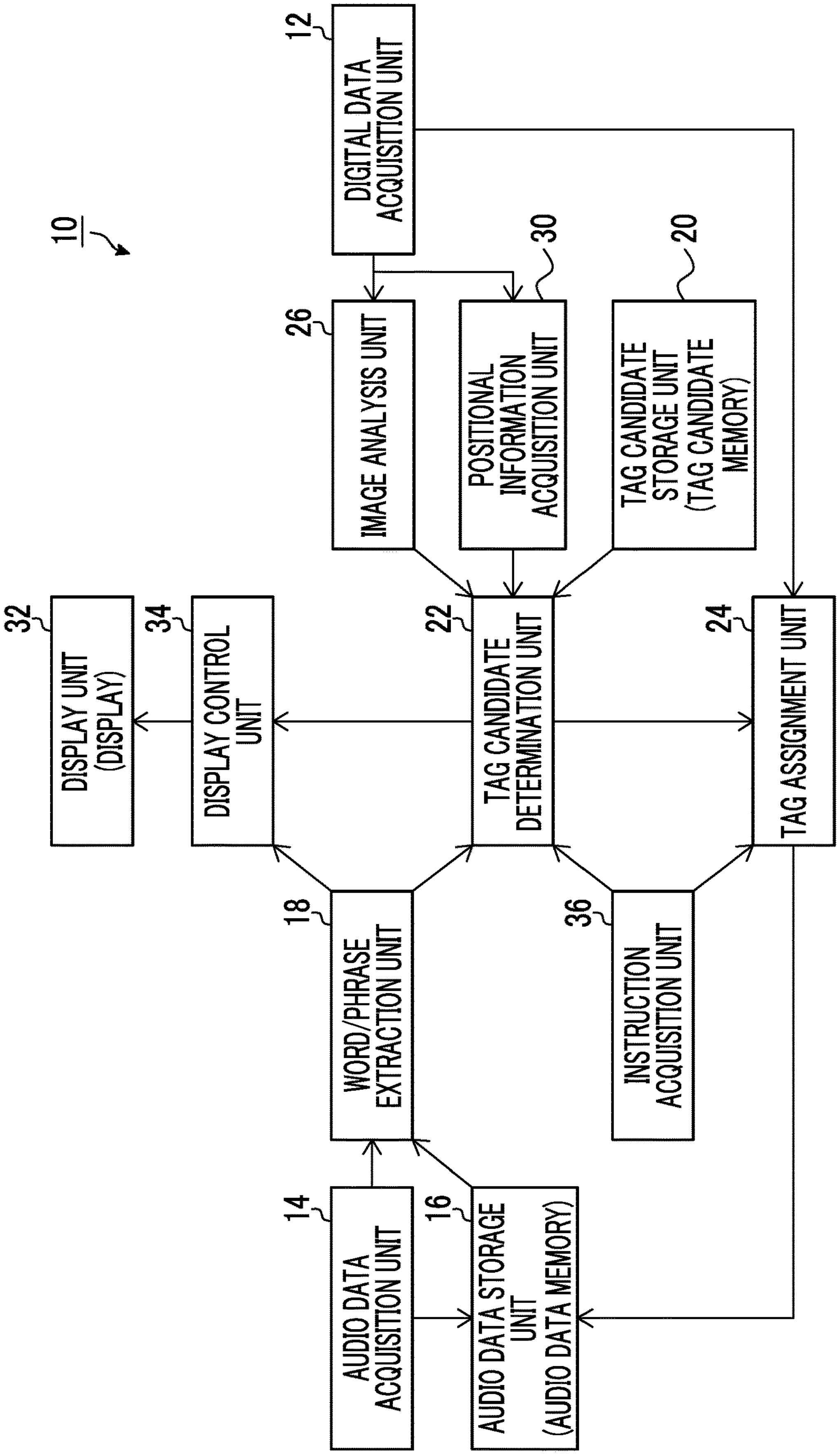
FIG. 1 is a block diagram of an embodiment showing a configuration of a tagging apparatus according to an embodiment of the present invention.

FIG. 1 is a block diagram of an embodiment showing a configuration of the tagging apparatus according to the embodiment of the present invention. A tagging apparatus 10 shown in FIG. 1 is an apparatus that assigns a tag related to a word/phrase included in audio data to digital data, and comprises a digital data acquisition unit 12, an audio data acquisition unit 14, an audio data storage unit 16, a word/phrase extraction unit 18, a tag candidate storage unit 20, a tag candidate determination unit 22, a tag assignment unit 24, an image analysis unit 26, a positional information acquisition unit 30, a display unit 32, a display control unit 34, and an instruction acquisition unit 36.

The digital data acquisition unit 12 is connected to the image analysis unit 26 and the positional information acquisition unit 30, and the audio data acquisition unit 14 is connected to the word/phrase extraction unit 18. The word/phrase extraction unit 18, the image analysis unit 26, the positional information acquisition unit 30, the instruction acquisition unit 36, and the tag candidate storage unit 20 are connected to the tag candidate determination unit 22. The digital data acquisition unit 12, the tag candidate determination unit 22, and the instruction acquisition unit 36 are connected to the tag assignment unit 24. The audio data acquisition unit 14 and the tag assignment unit 24 are connected to the audio data storage unit 16. The display control unit 34 is connected to the display unit 32, and the word/phrase extraction unit 18 and the tag candidate determination unit 22 are connected to the display control unit 34.

The digital data acquisition unit 12 acquires the digital data to which the tag is assigned.

The digital data may be anything as long as the tag can be assigned, and is not particularly limited, but includes image data, moving image data, text data, and the like.

The method of acquiring the digital data is not particularly limited. The digital data acquisition unit 12 can acquire image data selected by a user from, for example, image data of an image currently captured by a camera of a smartphone, digital camera, or the like, or image data previously captured and stored in an image data storage unit (not shown). The same also applies to the moving image data, the text data, and the like.

The audio data acquisition unit 14 acquires audio data related to the digital data acquired by the digital data acquisition unit 12.

The audio data is not particularly limited, but includes, for example, a voice of an uttered or spoken language by the user regarding the digital data, an environmental sound in a case in which the user utters or speaks the voice, and the like.

The audio data acquisition unit 14 can acquire one or two or more audio data for one digital data. The one audio data may include one or two or more user voices, the two or more audio data may be audio data including voices of different users, and may be audio data including the voices of the same user.

The method of acquiring the audio data is not particularly limited. The audio data acquisition unit 14 can acquire, for example, by recording the voice uttered or spoken by the user for the digital data by a function of a voice recorder of the smartphone or the digital camera, and the like. Alternatively, the audio data selected by the user from the audio data recorded previously and stored in the audio data storage unit 16 may be acquired.

The audio data storage unit (audio data memory) 16 stores the audio data acquired by the audio data acquisition unit 14.

For example, under the control of the tag assignment unit 24, the audio data storage unit 16 associates the digital data with the audio data related to the digital data, and stores the audio data having information on the association with the digital data.

The word/phrase extraction unit 18 extracts a word/phrase from the audio data acquired by the audio data acquisition unit 14. In addition, the word/phrase extraction unit 18 can also extract a word/phrase from the audio data stored in the audio data storage unit 16.

The word/phrase extracted by the word/phrase extraction unit 18 (hereinafter, also referred to as an extracted word/phrase) can be assigned as the tag to the digital data, and may be a word consisting of one character or two or more characters (character strings), or may be a phrase "Much fun" or the like.

The method of extracting the word/phrase is not particularly limited, but the word/phrase extraction unit 18 can, for example, convert the audio data into the text data by voice recognition to extract one or more words/phrases from the text data.

The tag candidate storage unit (tag candidate memory) 20 is a database in which a plurality of tag candidates that are candidates for tags assigned to the digital data are stored in advance.

The word/phrase stored as the tag candidate is not particularly limited. However, for example, for one word/phrase, a homonym, a synonym, and the like can be stored as the tag candidates in association with the one word/phrase.

For example, in a case of a Japanese environment, the tag candidate storage unit 20 stores, in association with "Ofuro" (meaning bath), "Furo" in Katakana, "Furo" in Kanji, "Ofuro" in Hiragana, a bath pictogram, the synonyms, such as "pool" and "public bath". In addition, the tag candidate storage unit 20 stores, for example, the homonym, such as "Zou" (meaning statue), in association with "Zou" (meaning elephant).

The tag candidate determination unit 22 determines, from among the plurality of tag candidates stored in the tag candidate storage unit 20, one or more tag candidates which has the homonyms and synonyms having different expressions and of which a degree of association with the extracted word/phrase is equal to or more than a first threshold value, in other words, a tag candidate having a higher degree of association with the extracted word/phrase than other tag candidates, as a first tag candidate.

The tag candidate determination unit 22 can determine, from among the plurality of tag candidates stored in the tag candidate storage unit 20, the tag candidate of which the degree of association with the extracted word/phrase is equal to or more than the first threshold value, as the first tag candidate, in addition to the tag candidate associated with the extracted word/phrase. In addition, the tag candidate determination unit 22 can determine the word/phrase of which the degree of association with the extracted word/phrase is equal to or more than the first threshold value, as the first tag candidate, in addition to the tag candidate stored in the tag candidate storage unit 20.

A specific method of determining the tag candidates will be described below.

The tag assignment unit 24 assigns, as the tag, at least one of a tag candidate group including the extracted word/phrase and the first tag candidate determined by the tag candidate determination unit 22 to the digital data. The assigned tag is stored in association with the digital data. The tag may be stored any storage location. In a case in which the digital data has a header region in an exchangeable image file format (Exif), the header region may be used as the storage location of the tag, or a dedicated storage region provided in the tagging apparatus 10 for the tag may be used as a storage location of the tag.

The image analysis unit 26 recognizes at least one of a subject or a scene included in the image corresponding to the image data.

The method of extracting the subject or the scene from the image is not particularly limited, and various known methods in the related art can be used.

In a case in which the digital data is the image data, the positional information acquisition unit 30 acquires information on an imaging position of the image corresponding to the image data.

The method of acquiring the information on the imaging position is not particularly limited. For example, header information (image information) in the Exif format is assigned to the image captured by the camera of the smartphone or the digital camera. The header information includes information, such as an imaging date and time and the imaging position of the image. Therefore, the positional information acquisition unit 30 can acquire the information on the imaging position from, for example, the header information on the image.

The display control unit 34 controls display by the display unit 32. That is, the display unit (display) 32 displays various types of information under the control of the display control unit 34.

The display control unit 34 displays an operation screen in a case in which the tag is assigned to the digital data, a text corresponding to the text data, the tag candidate group, a list of tags assigned to the digital data, and the like, on the display unit 32.

A specific display method of the tag candidate will be described below.

The instruction acquisition unit 36 acquires various instructions input from the user.

Examples of the instruction input from the user include an instruction to select the extracted word/phrase for displaying the tag candidate from among one or more extracted words/phrases included in the text displayed on the display unit 32, and an instruction to select the extracted word/phrase or the first tag candidate included in the tag candidate group from the tag candidate group displayed on the display unit 32.

Figure 2:
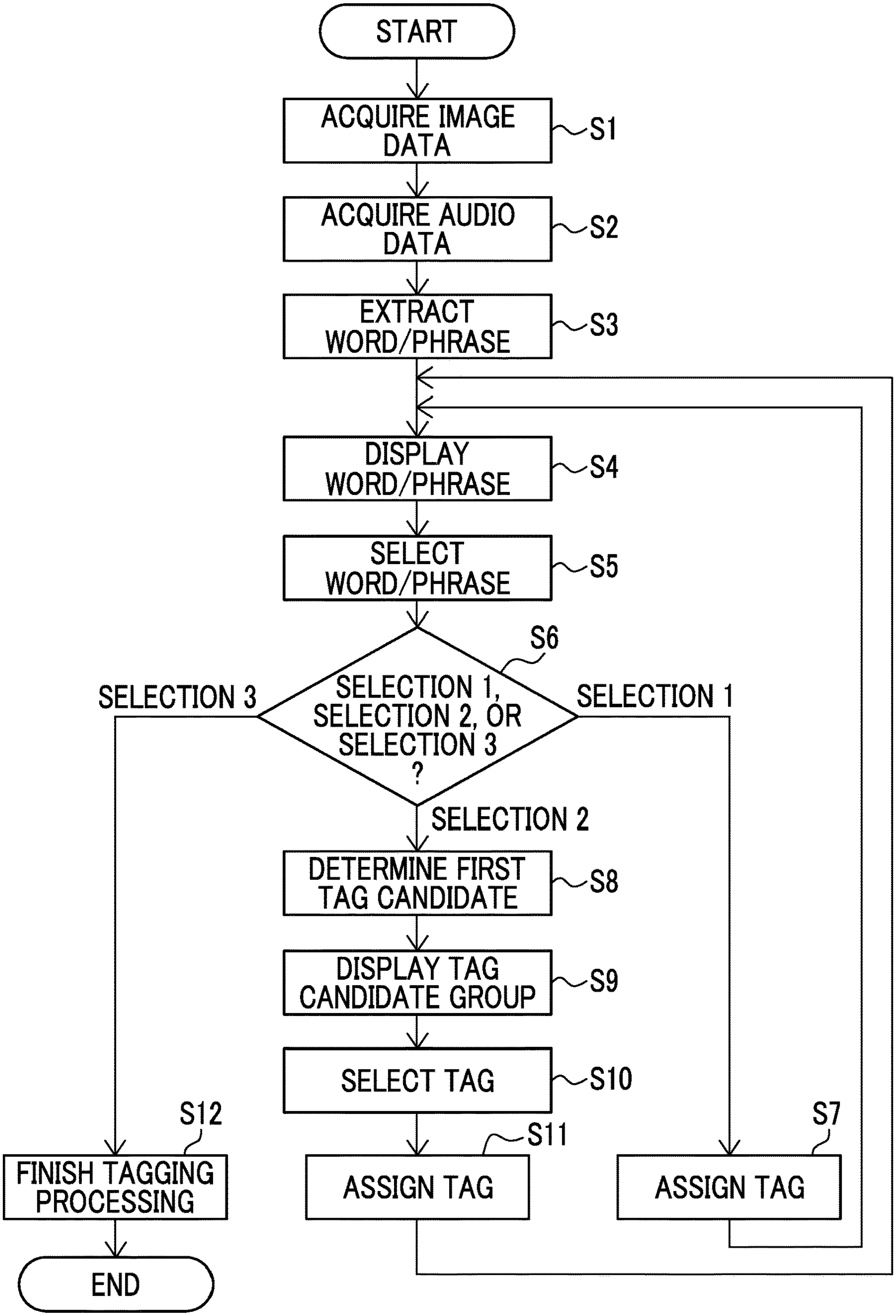
FIG. 2 is a flowchart of an embodiment showing an operation of the tagging apparatus.

Hereinafter, an operation of the tagging apparatus 10 will be described with reference to the flowchart shown in FIG. 2. In the following description, as an example, it is assumed that the tag is assigned to the image data by using an application of the tagging apparatus 10 that operates on the smartphone.

In a case in which the user performs tagging, the display control unit 34 displays a tagging operation screen on the display unit 32, that is, a display screen of the smartphone.

On the tagging operation screen, the user first selects the image data to which the tag is assigned, from the image data of the user stored in the smartphone. The user can select, for example, the image data to which the tag is assigned, by tapping (pressing) one desired image from a list of images corresponding to the image data displayed on the display screen of the smartphone.

Figure 3:
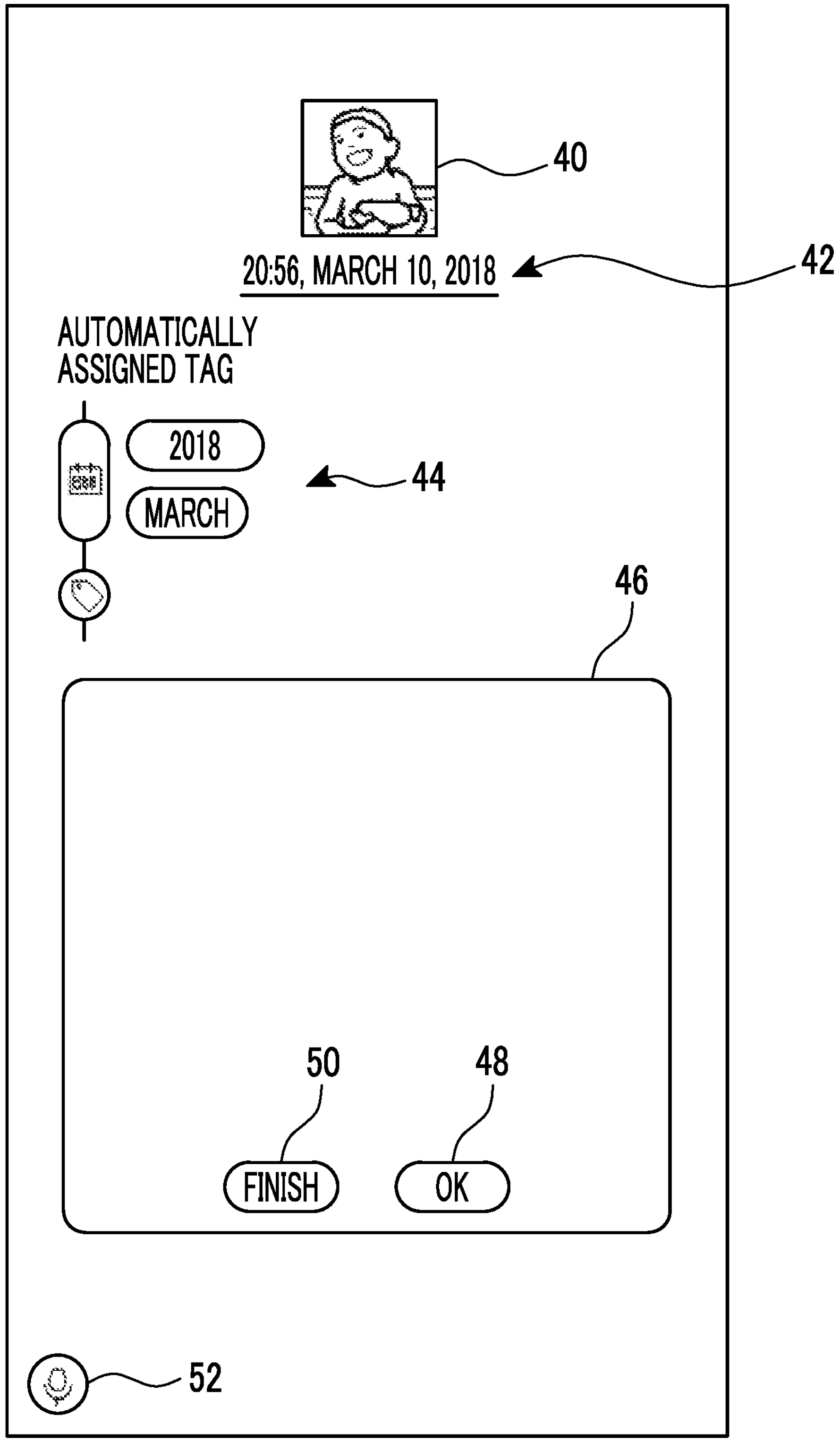
FIG. 3 is a conceptual diagram of an embodiment showing a tagging operation screen.

Accordingly, the digital data acquisition unit 12 acquires the image data (step S1), and the display control unit 34 displays the image corresponding to the image data on the tagging operation screen as shown in FIG. 3.

On an upper part of the tagging operation screen shown in FIG. 3, an image (photo) 40 corresponding to the image data, which is a tagging target, is displayed, and "20:56, Mar. 10, 2018", which is information 42 on the imaging date and time of the image is displayed below the image 40. On a central part of the tagging operation screen, "2018" and "March" as a list of tags 44 automatically assigned to the image data from the information 42 on the imaging date and time of the image are displayed. On a lower part of the tagging operation screen, a text display region 46 for displaying the text corresponding to the text data converted from the audio data is displayed, and an "OK" button 48 and a "finish" button 50 are displayed in the text display region 46. On a lower left part of the tagging operation screen, a voice input button 52 is displayed.

Then, the user presses the voice input button 52 while viewing the image 40 displayed on the tagging operation screen, thereby the user records a voice uttering "Ofurodeasondatokini" in Japanese (meaning "When he played in a bath" in English) with respect to the image 40 by using the function of the voice recorder of the smartphone.

Accordingly, the audio data acquisition unit 14 acquires the audio data of the voice uttered by the user (step S2).

Then, the word/phrase extraction unit 18 converts, for example, this audio data into the text data. The word/phrase extraction unit 18 converts, for example, the audio data "Ofurodeasondatokini" into the text data corresponding to the Japanese text "Ofurodeasondatokini".

Then, the word/phrase extraction unit 18 extracts the one or more words/phrases from the text data (step S3). For example, the word/phrase extraction unit 18 extracts three words/phrases, which are "Ofuro (bath)", "Ason (play)", and "Toki (when)", from the text "Ofurodeasondatokini" corresponding to the text data.

Figure 4:
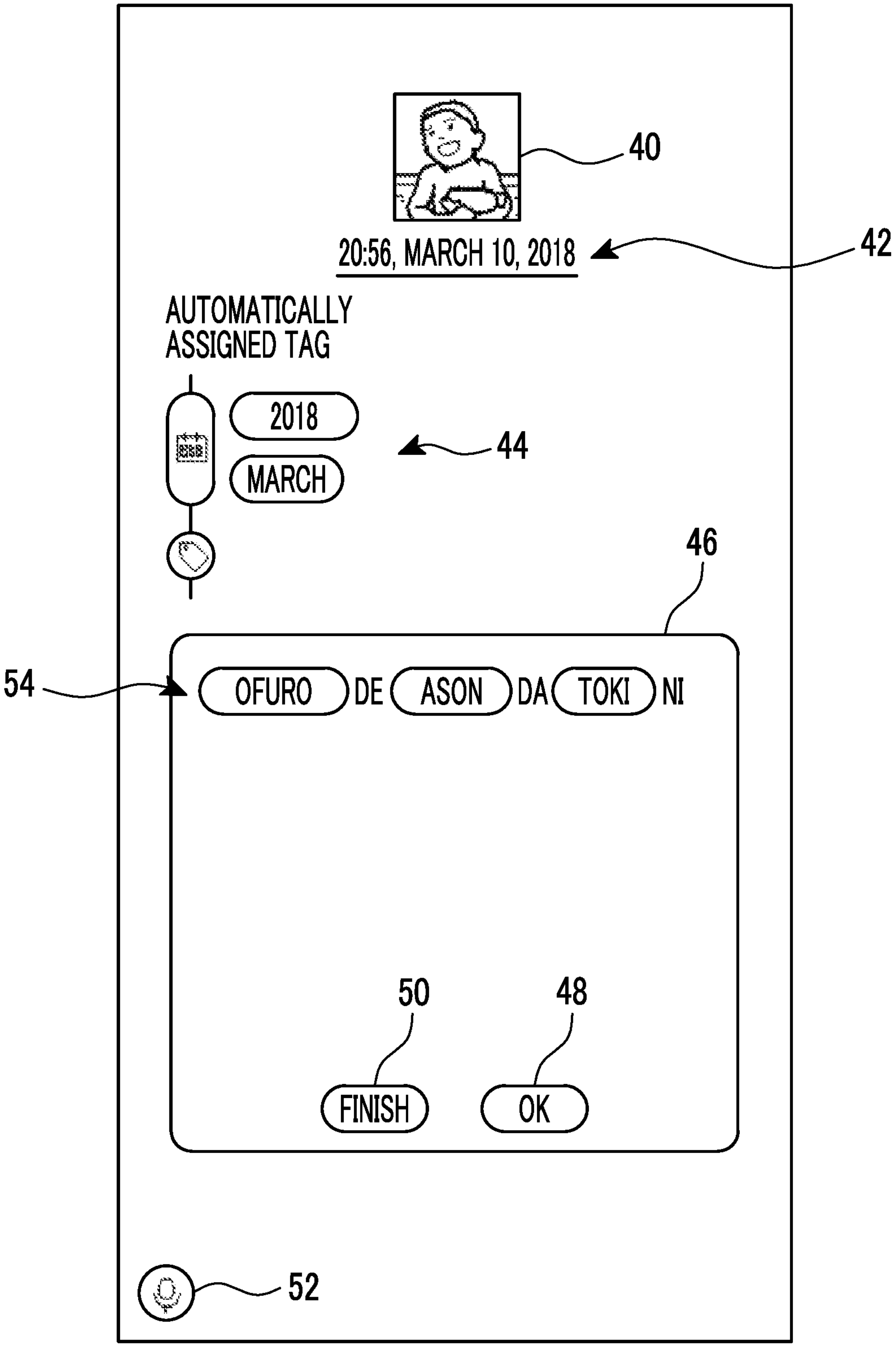
FIG. 4 is a conceptual diagram of an embodiment showing a state in which a text corresponding to audio data is displayed.

Then, the display control unit 34 displays this text in the text display region 46 (step S4). For example, as shown in FIG. 4, the display control unit 34 displays surrounds these three words/phrases with a frame line in the text 54.

Accordingly, the user can know that the three words/phrases surrounded with the frame line are words/phrases that can be assigned to the image data as the tags.

Then, the user selects the word/phrase to be assigned as the tag to the image data from among the one or more words/phrases included in the text 54 displayed in the text display region 46 (step S5). The user selects, for example, "Ofuro" from "Ofuro", "Ason", and "Toki".

Figure 5:
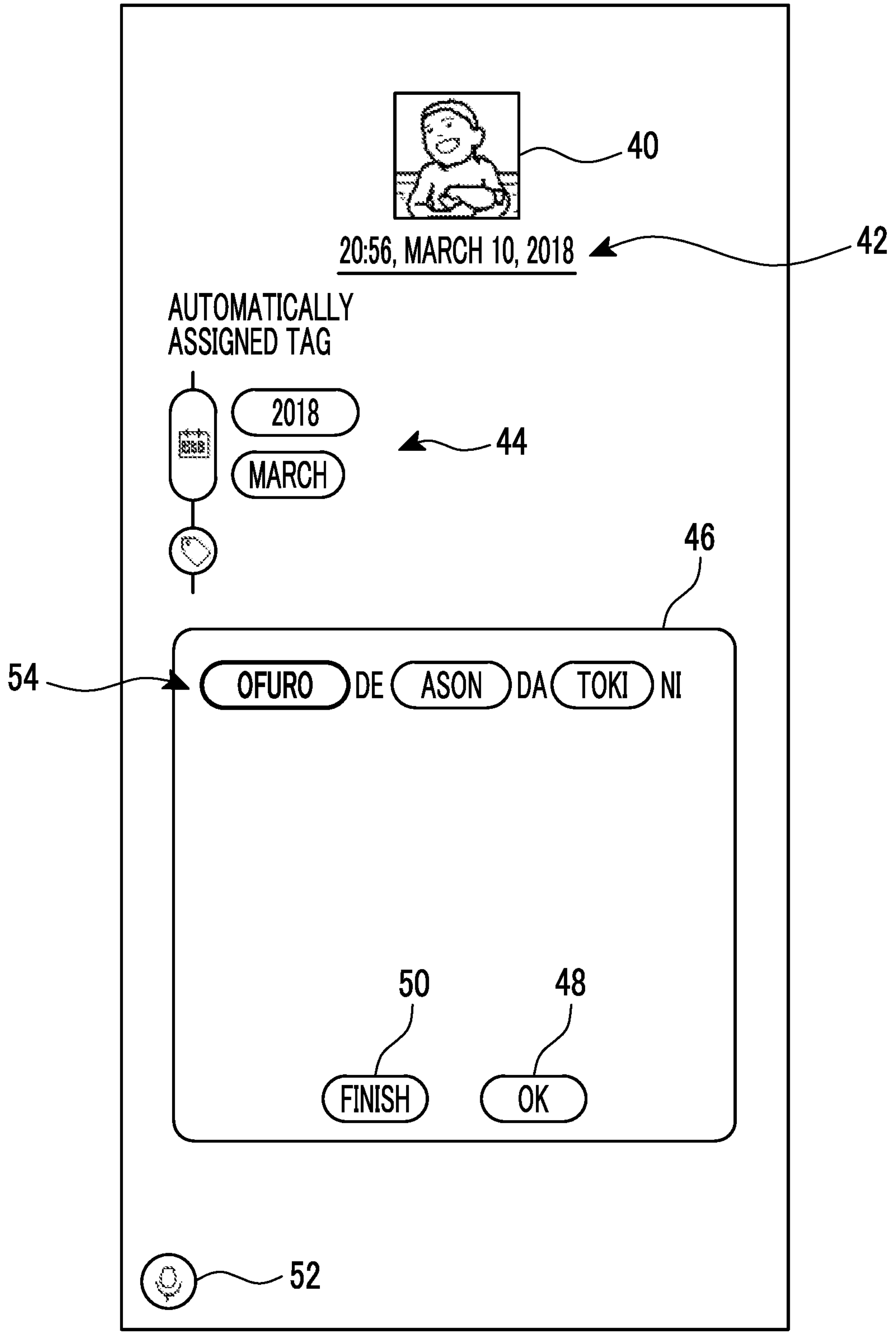
FIG. 5 is a conceptual diagram of an embodiment showing a state in which a word/phrase is selected from the text.

Accordingly, as shown in FIG. 5, the display control unit 34 displays the word/phrase selected by the user in a highlighted manner. The display control unit 34 displays this "Ofuro" in a highlighted manner by, for example, changing a display color of "Ofuro" to a color different from a display color of the text. For example, in a case in which the display color of the text is black, the display control unit 34 displays "Ofuro" by changing the display color of "Ofuro" to yellow. In a case in which the user selects "Ason" or "Toki" from this state, the display color of "Ofuro" is restored to black, and each of the selected texts is changed to yellow. In addition, in a case in which a region other than the selectable region is pressed, the state is restored to the state of step S4. It should be noted that, in FIG. 5, instead of changing the display color of "Ofuro", "Ofuro" is shown by a thick line.

As a result, the user can know that "Ofuro" is selected.

Then, the user can select whether to press the "OK" button 48, to press "Ofuro", which is the word/phrase being selected, again, or to press the "finish" button 50 on the tagging operation screen (step S6).

In a case in which the user presses the "OK" button 48 (selection 1 in step S6), the tag assignment unit 24 assigns the selected word/phrase as the tag to the image data (step S7).

Figure 6:
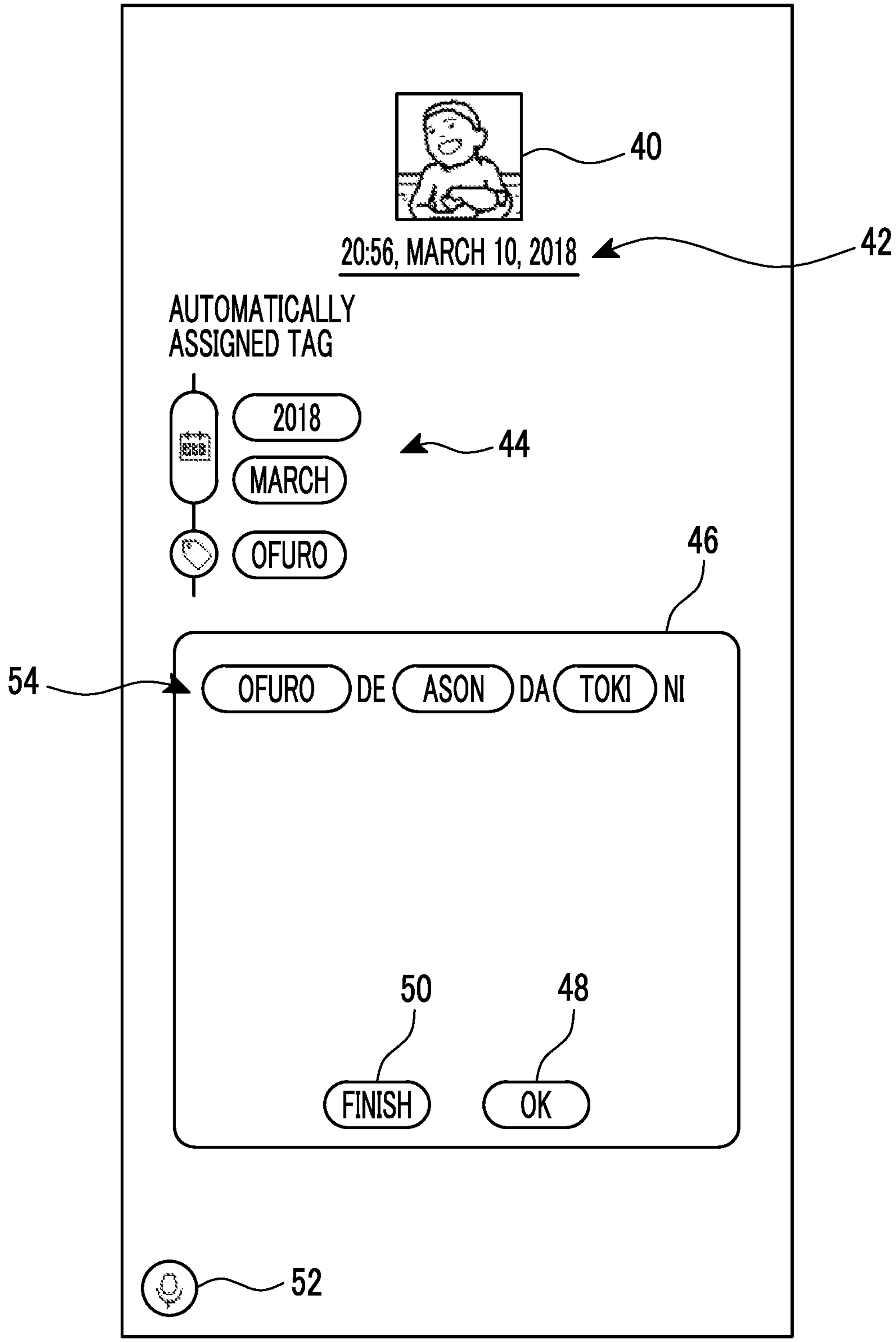
FIG. 6 is a conceptual diagram of an embodiment showing a state in which a list of tags is updated.

Then, the display control unit 34 displays the word/phrase selected by the user in the list of tags 44. That is, as shown in FIG. 6, the display control unit 34 adds "Ofuro" to the list of tags 44, and displays the list of tags 44 on the tagging operation screen. In addition, the display control unit 34 restores the display color of "Ofuro" in the text 54 to black. Then, the processing returns to step S4. In a case in which it is desired to assign another word/phrase as the tag, another word/phrase need only be selected, and the "OK" button 48 need only be pressed.

In a case in which the user presses the selected word/phrase "Ofuro" again (selection 2 in step S6), a tag candidate display mode is set, and the tag candidate determination unit 22 determines one or more tag candidates of which the degree of association with the word/phrase is equal to or more than the first threshold value from among the plurality of tag candidates stored in the tag candidate storage unit 20 as the first tag candidate based on the word/phrase selected by the user from among the one or more words/phrases included in the text displayed in the text display region 46 (step S8). The tag candidate determination unit 22 determines, for example, the tag candidates, such as "Furo" in Katakana, "Furo" in Kanji, and "Ofuro" in Hiragana, of which the degree of association with "Ofuro" is equal to or more than the first threshold value from among the plurality of tag candidates stored in the tag candidate storage unit 20 as the first tag candidates.

Then, the display control unit 34 displays the tag candidate group including the word/phrase and the first tag candidate (step S9). That is, as shown in FIG. 7, the display control unit 34 displays, in addition to "Ofuro" which is the extracted word/phrase, a window screen (pop-up screen) 56 of the tag candidate group including "Furo" in Katakana, "Furo" in Kanji, and "Ofuro" in Hiragana, which are the first tag candidates, to be superimposed on the tagging operation screen in a format of a balloon from "Ofuro", which is the extracted word/phrase, such that it can be seen that "Furo" in Katakana, "Furo" in Kanji, and "Ofuro" in Hiragana are the first tag candidates for "Ofuro" which is the extracted word/phrase.

Figure 7:
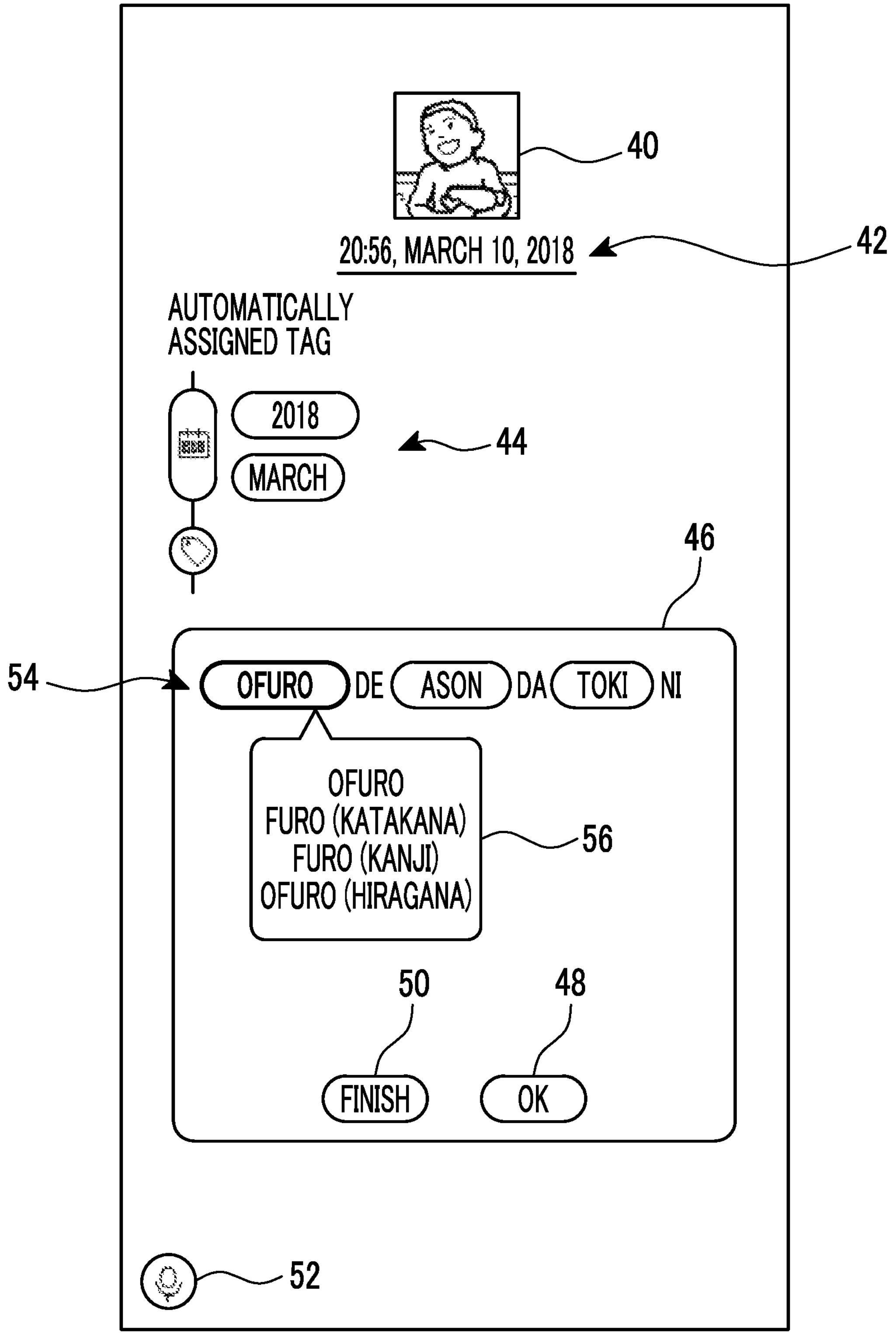
FIG. 7 is a conceptual diagram of an embodiment showing a state in which a tag candidate group is displayed.

It should be noted that, in the example of FIG. 7, the window screen of the tag candidate group is displayed as one window including all "Ofuro", which is the extracted word/phrase, "Furo" in Katakana, "Furo" in Kanji, and "Ofuro" in Hiragana, but the present invention is not limited to this, and four independent windows including these four words/phrases, respectively, may be displayed. In addition, as shown in FIG. 7, the window screen of the tag candidate group may be displayed not to be superimposed on the text 54, the "OK" button 48, the "finish" button 50, and the like, or may be displayed the text 54, the "OK" button 48, the "finish" button 50, and the like.

Then, the user selects at least one of the word/phrase or the first tag candidate as the tag from the tag candidate group displayed in the window screen 56 (step S10). The user selects, for example, "Furo" in Kanji from "Furo" in Katakana, "Furo" in Kanji, and "Ofuro" in Hiragana.

Accordingly, the tag assignment unit 24 assigns at least one selected by the user from the tag candidate group displayed in the window screen 56 to the image data as the tag (step S11). That is, the tag assignment unit 24 assigns "Furo" in Kanji as the tag to the image data.

Figure 8:
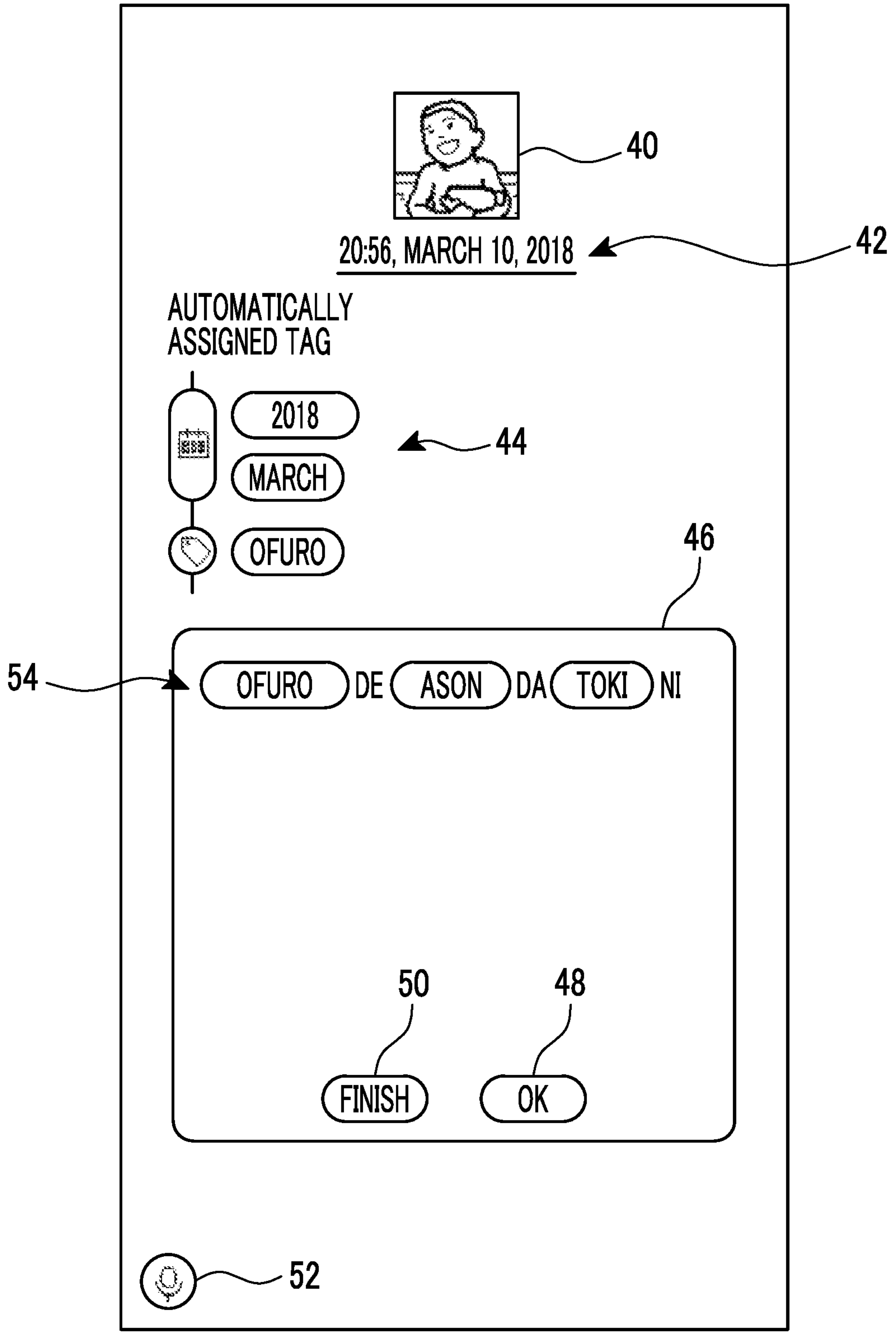
FIG. 8 is a conceptual diagram of another embodiment showing the state in which the list of tags is updated.

Then, the display control unit 34 displays the word/phrase selected by the user in the list of tags 44. That is, as shown in FIG. 8, the display control unit 34 adds "Furo" to the list of tags 44, and displays the list of tags 44 on the tagging operation screen. In addition, the display control unit 34 restores the display color of "Ofuro" in the text 54 to black and turns off the display of the window screen 56 of the tag candidate group on the tagging operation screen. Then, the processing returns to step S4. In a case in which it is desired to assign the first tag candidates related to still another word/phrase, for example, "Ason" as the tag, the user selects "Ason", and then selects "Ason" again. Accordingly, the first tag candidates related to "Ason" are determined and displayed, and thus the user need only select one of the first tag candidates related to displayed "Ason".

In a case in which the user presses the "finish" button 50 (selection 3 in step S6), for example, a message box "Tagging is confirmed. The text currently displayed in the text region is discarded. Are you sure?" is displayed. In a case in which the user presses a "not finish" button that is simultaneously displayed in the message box, the state is restored to the state before pressing the "finish" button 50. On the other hand, in a case in which the user presses a "finish" button that is simultaneously displayed in the message box, the tagging processing is finished (step S12), and the display control unit 34 turns off the display of the text from the tagging operation screen. It should be noted that the "finish" button 50 can be pressed at any step other than step S6. Accordingly, the user can return to the tagging operation screen shown in FIG. 3.

In a case in which the tag candidate cannot be extracted, the tagging flow using the acquired audio data is finished, and the audio data is acquired again, and the tagging flow is performed.

In the tagging apparatus 10, since the tag is assigned by using the audio data, the tag can be easily assigned to the digital data, and even a plurality of tags can be easily assigned. In addition, in the tagging apparatus 10, the audio data of the uttered or spoken language by the user can be used, and thus, for example, an emotional tag, such as "Tanoshikattane" (Much fun), can be assigned.

Further, in the tagging apparatus 10, the word/phrase is extracted from the audio data, the tag candidate of which the degree of association with the word/phrase is high is determined from among the plurality of tag candidates, which are stored in advance, as the first tag candidate, and at least one of the tag candidate group including the word/phrase and the first tag candidate is assigned to the digital data as the tag. Therefore, in the tagging apparatus 10, it is possible for the user to easily assign the desired tag to the digital data by using the voice, regardless of the homonyms and the synonyms having different expressions.

Hereinafter, the method of determining the tag candidate and the method of displaying the tag candidate will be described with reference to specific examples.

For example, the synonym having a high degree of similarity in pronunciation to the extracted word/phrase may be used as the first tag candidate. That is, the tag candidate determination unit 22 may include a first synonym of which the degree of similarity in pronunciation to the extracted word/phrase is equal to or more than the first threshold value among the synonyms of the extracted word/phrase in the first tag candidate.

In a case in which the word/phrase "Ofuro" is extracted from the audio data, for example, the tag candidate determination unit 22 can include, for example, "Furo" in Katakana, "Furo" in Kanji, and "Ofuro" in Hiragana having a high degree of similarity in pronunciation to "Ofuro" among the synonyms of this "Ofuro" in the first tag candidates.

In addition, the synonym having a high degree of similarity in meaning to the extracted word/phrase may be used as the first tag candidate. That is, the tag candidate determination unit 22 may include a second synonym of which the degree of similarity in meaning to the extracted word/phrase is equal to or more than the first threshold value among the synonyms of the extracted word/phrase in the first tag candidate.

Similarly, in a case in which the word/phrase "Ofuro" is extracted from the audio data, the tag candidate determination unit 22 can include "Yokushitsu", "Basu", "bath", and a bathtub pictogram of which the degree of similarity in meaning to "Ofuro" is high among the synonyms of this "Ofuro" in the first tag candidates.

Further, both the first synonym and the second synonym described above may be used as the first tag candidates. That is, the tag candidate determination unit 22 may include the first synonym of which the degree of similarity in pronunciation to the extracted word/phrase is equal to or more than the first threshold value and the second synonym of which the degree of similarity in meaning to the extracted word/phrase is equal to or more than the first threshold value among synonyms of the extracted word/phrase in the first tag candidates.

Similarly, in a case in which the word/phrase "Ofuro" is extracted from the audio data, the tag candidate determination unit 22 includes "Furo" in Kanji from "Furo" in Katakana, "Furo" in Kanji, "Ofuro" in Hiragana, "Yokushitsu", "Basu", "bath", and the bathtub pictogram in the first tag candidates.

It should be noted that, in a case in which both the first synonym and the second synonym are used as the first tag candidates, it is desirable that the tag candidate determination unit 22 determines the number of the first synonyms and the number of the second synonyms to be included in the first tag candidates such that the number of the first synonyms having a high degree of similarity in pronunciation is larger than the number of the second synonyms having a high degree of similarity in meaning.

Similarly, in a case in which the word/phrase "Ofuro" is extracted from the audio data, for example, the tag candidate determination unit 22 can include "Ofuro" as the extracted word/phrase, "Furo" in Katakana and "Furo" in Kanji as the first synonyms, and "Yokushitsu" as the synonym in the first tag candidates.

In addition, the tag candidate determination unit 22 may use the tag candidate for the homonym of the extracted word/phrase as the first tag candidate.

For example, in Japanese, it is known that there are two types of "Kaki", a fruit "Persimmon" and a marine product "Oyster", so that it is possible to store two tag candidates of "Persimmon" and "Oyster" in the tag candidate storage unit 20 in advance in association with the utterance of "Kaki". In a case in which the word/phrase "Kaki" (Persimmon) is extracted from the audio data including the voice "Kaki, oishi!" (""Kaki" is delicious!" in English), the tag candidate determination unit 22 can include "Kaki" (Oyster) which is the homonym of "Persimmon" in the first tag candidate. Similarly, in a case of an English voice, in a case in which the audio data can be interpreted as either "The hare is beautiful" or "The hair is beautiful.", it is possible to include both "hare" and "hair" in the first tag candidates.

Further, the tag candidate determination unit 22 may simultaneously use three of the first synonym, the second synonym, and the homonym as the first tag candidates.

It is considered that a possibility that the extracted word/phrase or the tag candidate previously selected by the user is the word/phrase or the tag candidate preferred by the user is higher than that of the extracted word/phrase or the tag candidate that is not previously selected.

Accordingly, the display control unit 34 may display the extracted word/phrase or the tag candidate, which is previously selected by the user, for the extracted word/phrase from the tag candidate group with higher priority than the extracted word/phrase or the tag candidate, which is not previously selected by the user, for the same extracted word/phrase. In addition, the display control unit 34 may display the extracted word/phrase or the tag candidate, which is previously selected many times, for the extracted word/phrase among the extracted words/phrases or the tag candidates, which are previously selected by the user, with higher priority than the extracted word/phrase or the tag candidate, which is previously selected few times, for the same extracted word/phrase.

As a result, since the extracted word/phrase or the tag candidate that has a high possibility of being preferred by the user is displayed with higher priority, it is possible to improve the convenience in a case in which the user selects the extracted word/phrase or the tag candidate from the tag candidate group.

In a case in which the digital data is the image data, a word/phrase which represents a name of the subject included in the image corresponding to the image data may be used as the tag candidate.

In such a case, the image analysis unit 26 recognizes the subject included in the image corresponding to the image data.

Then, the tag candidate determination unit 22 determines the word/phrase, which represents the name of the subject corresponding to the extracted word/phrase and that is different from the extracted word/phrase, as a second tag candidate.

Then, the display control unit 34 displays the second tag candidate on the display unit 32 by including the second tag candidate in the tag candidate group.

For example, it is assumed that the audio data of the mother who utters "Ofuromitaidetanoshikattadesu" (It was much fun like a bath) is acquired for an image in which a baby plays in a vinyl pool, and the word/phrase “Ofuro” is extracted from the audio data.

In such a case, in a case in which the tag candidate display mode is set by the mother pressing this “Ofuro” twice in a row, the image analysis unit 26 recognizes that the subject included in the image is “Vinyl pool”.

Since the extracted words/phrases “Ofuro” and “Vinyl pool” are different from each other, the tag candidate determination unit 22 determines this word/phrase “Vinyl pool” as the second tag candidate.

Then, the display control unit 34 displays “Vinyl pool” in addition to “Ofuro” in the tag candidate group.

As a result, even in a case in which the user makes a mistake in the name of the subject in the image, or even in a case in which the uttered target is a target different from the correct subject due to the utterance of a metaphorical expression, the name of the correct subject can be used as the tag candidate.

It should be noted that the second tag candidate may be displayed side by side with the first tag candidate, but since “Vinyl pool” is the correct name of “Ofuro”, it is preferable to display “Vinyl pool” in association with “Ofuro”. For example, in a case in which a plurality of first tag candidates are displayed side by side in the vertical direction, “Vinyl pool” as the second tag candidate is displayed side by side with “Ofuro” as the first tag candidate among the plurality of first tag candidates in the horizontal direction.

In addition, in a case in which the digital data is the image data, the number of the first tag candidates may be limited based on at least one of the subject or the scene included in the image corresponding to the image data.

In such a case, the image analysis unit 26 recognizes at least one of the subject or the scene included in the image corresponding to the image data.

Further, in a case in which there are a predetermined number or more of the tag candidates of which the degree of association with the extracted word/phrase is equal to or more than the first threshold value among the plurality of tag candidates stored in the tag candidate storage unit 20, the tag candidate determination unit 22 determine only the tag candidate of which the degree of association with at least one of the subject or the scene is equal to or more than a second threshold value from among the predetermined number or more of the tag candidates as the first tag candidate.

For example, in a case in which there are 10 tag candidates having a high degree of association with “Ofuro”, the tag candidate determination unit 22 determines only five tag candidates having a high degree of association with “Baby” shown in the image from among the 10 tag candidates as the first tag candidates.

Accordingly, even in a case in which the number of the tag candidates having a high degree of association with the extracted word/phrase is large, the number of the tag candidates can be limited, and a large number of the first tag candidates exceeding the predetermined number can be prevented from being displayed.

In a case in which the digital data is the image data, the word/phrase having a high degree of similarity of pronunciation to the extracted word/phrase may be used as the tag candidate based on at least one of the subject or the scene included in the image corresponding to the image data.

In such a case, the image analysis unit 26 recognizes at least one of the subject or the scene included in the image corresponding to the image data, and the tag candidate determination unit 22 determine the tag candidate of which the degree of association with at least one of the subject or the scene is equal to or more than the second threshold value and the degree of similarity of pronunciation to the extracted word/phrase is equal to or more than a third threshold value, from among the plurality of tag candidates stored in the tag candidate storage unit 20 as a third tag candidate.

Then, the display control unit 34 displays the third tag candidate on the display unit 32 by including the third tag candidate in the tag candidate group.

For example, it is assumed that audio data “Akasakanikimashita!” (Now in Akasaka!”) uttered by the user is acquired for an image showing a large red lantern of Kaminarimon, and the word/phrase “Akasaka” is extracted from the audio data.

In such a case, the image analysis unit 26 recognizes that the subject included in the image is “Red lantern of Kaminarimon” which is a famous place in Asakusa.

Then, the tag candidate determination unit 22 determines the word/phrase “Asakusa”, which has a high degree of association with “Red lantern of Kaminarimon” and a high degree of similarity in pronunciation to “Akasaka”, as the second tag candidate.

Then, the display control unit 34 displays “Asakusa” in addition to “Akasaka” in the tag candidate group.

As a result, even in a case in which the user mistakenly speaks “Asakusa” as “Akasaka” or “Asakusa” is erroneously recognized as “Akasaka” by voice recognition, the user can select a desired tag candidate that matches his/her intention from “Akasaka” and “Asakusa”.

The same applies to English. For example, it is assumed that audio data “Now in Dulles!” uttered by the user is acquired for an image showing a large red lantern of Kaminarimon, and the word/phrase “Dulles” is extracted from the audio data.

In such a case, the image analysis unit 26 recognizes that the subject included in the image is “Reunion tower” which is a famous place in Dallas.

Then, the tag candidate determination unit 22 determines the word/phrase “Dallas”, which has a high degree of association with “Reunion tower” and a high degree of similarity in pronunciation to “Dulles”, as the second tag candidate.

Then, the display control unit 34 displays “Dallas” in addition to “Dulles” in the tag candidate group.

As a result, even in a case in which the user mistakenly speaks “Dallas” as “Dulles” or “Dallas” is erroneously recognized as “Dulles” by voice recognition, the user can select a desired tag candidate that matches his/her intention from “Dulles” and “Dallas”.

In a case in which the digital data is image data, and a person tag, which represents the name of the subject included in the image, is assigned to the image corresponding to the image data by a first user, the name of the subject, which is variously called depending on an utterance person, may be used as the tag candidate.

In such a case, the image analysis unit 26 recognizes the subject included in the image.

Then, the word/phrase extraction unit 18 extracts the name of the subject from audio data including a voice of a second user who is different from the first user and utters the name of the subject for the image.

Then, the tag candidate determination unit 22 determines one or more tag candidates of which the degree of association with the name of the subject is equal to or more than the first threshold value as the first tag candidate to determine the person tag as a fourth tag candidate in a case in which the first tag candidate and the person tag assigned to the image are different from each other.

Then, the display control unit 34 displays the fourth tag candidate on the display unit 32 by including the fourth tag candidate in the tag candidate group.

For example, it is assumed that the user usually assigns the person tag of "Okasan" (Mother) to the image showing the user's mother.

On the other hand, it is assumed that the word/phrase "Obaatyan" (Grandma) is extracted from audio data "Obaatyan, mataasobinikitene!" (Grandma, come to play again!) uttered by the user's child to the image showing the user's mother.

In such a case, since the person tag "Okasan" is assigned to the image data, the image analysis unit 26 recognizes that the subject included in the image is "Okasan".

Then, the tag candidate determination unit 22 determines the word/phrase "Obaatyan" as the first tag candidate, and determines "Okasan" as the fourth tag candidate because these "Obaatyan" and "Okasan" are different from each other.

Then, the display control unit 34 displays "Okasan" in addition to "Obaatyan" in the tag candidate group.

In some countries, for example, in Japan, it is customary not to call a person by first name, but by a domestic relationship. Therefore, the same person may be called "Okasan" (as viewed from a daughter) or "Obaatyan" (as viewed from a grandchild). That is, a phenomenon in which the same person is called by different words occurs. However, according to the present aspect, the user can select a desired tag candidate from "Obaatyan" and "Okasan" even in a case in which the name of the subject is variously called depending on the utterance person.

In a case in which the digital data is the image data, a place name having a high degree of similarity of pronunciation to the extracted word/phrase may be used as the tag candidate based on the information on the imaging position of the image corresponding to the image data.

In such a case, the positional information acquisition unit 30 acquires the information on the imaging position of the image corresponding to the image data.

Then, the tag candidate determination unit 22 determines the tag candidate, which represents the place name that is located within a range equal to or less than a fourth threshold value from the imaging position of the image and has the degree of similarity of pronunciation to the extracted word/phrase being equal to or more than the third threshold value, from among the plurality of tag candidates stored in the tag candidate storage unit 20 as a fifth tag candidate based on the information on the imaging position of the image.

Then, the display control unit 34 displays the fifth tag candidate on the display unit 32 by including the fifth tag candidate in the tag candidate group.

For example, the word/phrase "Akasaka" is extracted from the audio data including the utterance "Akasaka", but it is assumed that there is "Asakusa" instead of "Akasaka" around the imaging position of the image from the information on the imaging position of the image.

In such a case, the tag candidate determination unit 22 determines the word/phrase "Asakusa", which is close to the imaging position of the image and has a high degree of similarity in pronunciation to "Akasaka", as the fifth tag candidate.

Then, the display control unit 34 displays "Asakusa" in addition to "Akasaka" in the tag candidate group.

As a result, even in a case in which the user mistakenly speaks "Asakusa" as "Akasaka" or "Asakusa" is erroneously recognized as "Akasaka" by voice recognition, the user can select a desired tag candidate from "Akasaka" and "Asakusa".

The same applies to English. For example, the word/phrase "Dulles" is extracted from the audio data including the utterance "Dulles", but it is assumed that there is "Dallas" instead of "Dulles" around the imaging position of the image from the information on the imaging position of the image.

In such a case, the tag candidate determination unit 22 determines the word/phrase "Dallas", which is close to the imaging position of the image and has a high degree of similarity in pronunciation to "Dulles", as the fifth tag candidate.

Then, the display control unit 34 displays "Dallas" in addition to "Dulles" in the tag candidate group.

As a result, even in a case in which the user mistakenly speaks "Dallas" as "Dulles" or "Dallas" is erroneously recognized as "Dulles" by voice recognition, the user can select a desired tag candidate from "Dulles" and "Dallas".

In a case in which the digital data is the image data, the name of the subject included in the image corresponding to the image data may be used as the tag candidate.

In such a case, the image analysis unit 26 recognizes the subject included in the image corresponding to the image data, and the positional information acquisition unit 30 acquires the information on the imaging position of this image.

Then, the word/phrase extraction unit 18 extracts the name of the subject from the audio data including the name of the subject included in the image.

In a case in which the name of the subject and an actual name of the subject located within a range equal to or less than the fourth threshold value from the imaging position of the image are different from each other, the tag candidate determination unit 22 determine the actual name of the subject as a sixth tag candidate based on the information on the imaging position of the image.

Then, the display control unit 34 displays the sixth tag candidate on the display unit 32 by including the sixth tag candidate in the tag candidate group.

For example, it is assumed that, although a word/phrase "star travel" is extracted from audio data including an utterance "Sutatoraberunikimashita!" (Now at "Star Travel!") for an image of an attraction in a theme park, this attraction is actually "Space fantasy", not "Star travel", from the information on the imaging position of the image.

In such a case, since "Star travel" and "Space fantasy" near the imaging position of the image are different from each other, the tag candidate determination unit 22 determines this "Space fantasy" as the fifth tag candidate.

Then, the display control unit 34 displays "Space fantasy" in addition to "Star travel" in the tag candidate group.

Accordingly, even in a case in which the user mistakenly speaks "Space fantasy" as "Star travel", the user can select a desired tag candidate from "Star travel" and "Space fantasy".

In addition, in a case in which there are a plurality of images, the actual name of the subject included in the image may be automatically assigned to each image as the tag in the same manner as described above.

That is, in a case in which the sixth tag candidate is selected by the user from the tag candidate group including the sixth tag candidate displayed on the display unit 32 for one image data, for each of a plurality of image data corresponding to a plurality of images captured within a predetermined period, the tag candidate determination unit 22 determines the actual name corresponding to the subject included in each of the plurality of images as a seventh tag candidate.

Then, the tag assignment unit 24 assign the seventh tag candidate corresponding to each of the plurality of image data to each of the plurality of image data as the tag.

In a case in which the extracted word/phrase is the place name and there are a plurality of locations of the place name, the place name including the location may be used as the tag candidate.

That is, the word/phrase extraction unit 18 extracts the place name from the audio data including the place name.

In a case in which there are the plurality of locations of the place names, the tag candidate determination unit 22 determines a plurality of tag candidates consisting of a combination of the place name and each of the plurality of locations as an eighth tag candidate.

Then, the display control unit 34 displays the eighth tag candidate on the display unit 32 by including the eighth tag candidate in the tag candidate group.

For example, in a case in which "Otemachi" is extracted from audio data including a voice "Otemachi", the tag candidate determination unit 22 determines "Otemachi (Tokyo)" and "Otemachi (Ehime)" as the eighth tag candidates.

Then, the display control unit 34 displays "Otemachi (Tokyo)" and "Otemachi (Ehime)" in addition to "Otemachi" in the tag candidate group.

Accordingly, the user can select desired tag information from "Otemachi" in Tokyo and "Otemachi" in Ehime.

It should be noted that, for example, for a user residing in Tokyo, there is a possibility that the display of "Otemachi (Tokyo)" is an extra display. On the other hand, for example, in a case in which it is registered in advance that the user is resident in Tokyo, "Otemachi" may be displayed instead of "Otemachi (Tokyo)". In addition, in a case in which it is desired to distinguish the locations within the tagging apparatus 10, "Otemachi (Tokyo)" and "Otemachi (Ehime)" may be stored in a distinguishable manner. Alternatively, in a case in which both "Otemachi (Tokyo)" and "Otemachi (Ehime)" are displayed and one of "Otemachi (Tokyo)" or "Otemachi (Ehime)" is selected as the tag by the user, the display of the location may be turned off and only "Otemachi" may be assigned as the tag to the image data.

In addition to the voice included in the audio data, the onomatopoeia corresponding to the environmental sound, for example, at least one of a sound onomatopoeic word or a voice onomatopoeic word may be used as the tag candidate.

In such a case, the word/phrase extraction unit 18 extracts at least one of the sound onomatopoeic word or the voice onomatopoeic word corresponding to the environmental sound included in the audio data from the audio data.

Then, the tag candidate determination unit 22 determines at least one of the sound onomatopoeic word or the voice onomatopoeic word as a ninth tag candidate.

Then, the display control unit 34 displays the ninth tag candidate on the display unit 32 by including the ninth tag candidate in the tag candidate group.

For example, it is assumed that the word/phrase "zaza", which is the onomatopoeia of a rain sound, is extracted as the sound onomatopoeic word from the audio data including the rain sound.

In such a case, the tag candidate determination unit 22 determines this "zaza" as the ninth tag candidate. In addition, the tag candidate determination unit 22 may use a tag candidate "rain" in addition to "zaza".

Then, the display control unit 34 displays "zaza" in the tag candidate group.

Accordingly, the user can easily assign the onomatopoeia tag corresponding to the environmental sound to the image data.

In a case in which the user acquires, for example, the audio data of the voice uttered for the image, there is a possibility that the audio data is one of the memories when the image is captured. The same also applies to all digital data in addition to the image.

Accordingly, the tag assignment unit 24 may associate the digital data with the audio data related to the digital data, and may store the audio data having the information on the association with the digital data in the audio data storage unit 16.

Accordingly, for example, in a case of viewing the image, the user can play back and listen to the audio data associated with the image data corresponding to the image.

In many cases, the moving image data includes the audio data.

Accordingly, in a case in which the digital data is the moving image data, the audio data acquisition unit 14 may acquire the audio data from the moving image data, and the word/phrase extraction unit 18 may extract the word/phrase from the audio data acquired from the moving image data.

In such a case, the user can assign the tag to the image data by using the extracted word/phrase automatically extracted from the audio data included in the moving image data.

In the apparatus according to the embodiment of the present invention, the hardware configuration of the processing units that execute various types of processing, such as the digital data acquisition unit 12, the audio data acquisition unit 14, the word/phrase extraction unit 18, the tag candidate determination unit 22, the tag assignment unit 24, the image analysis unit 26, the positional information acquisition unit 30, the display control unit 34, and the instruction acquisition unit 36, may be dedicated hardware, or may be various processors or computers that execute programs. In addition, the audio data storage unit 16 and the tag candidate storage unit 20 can be configured by using a memory, such as a semiconductor memory, a hard disk drive (HDD), or a solid state drive (SSD).

The various processors include a central processing unit (CPU), which is a general-purpose processor that executes software (program) and functions as the various processing units, a programmable logic device (PLD), which is a processor of which a circuit configuration can be changed after manufacture, such as a field programmable gate array (FPGA), and a dedicated electric circuit, which is a processor having a circuit configuration that is designed for exclusive use in order to execute specific processing, such as an application specific integrated circuit (ASIC).

One processing unit may be configured by using one of the various processors or may be configured by using a combination of two or more processors of the same type or different types, for example, a combination of a plurality of FPGAs or a combination of an FPGA and a CPU. In addition, a plurality of processing units may be configured by using one of various processors, or two or more of the plurality of processing units may be collectively configured by using one processor.

For example, first, as represented by a computer, such as a client and a server, there is a form in which one processor is configured by using a combination of one or more CPUs and software and this processor functions as the plurality of processing units. In addition, as represented by a system on chip (SoC) or the like, there is a form in which the processor is used in which the functions of the entire system which includes the plurality of processing units are realized by a single integrated circuit (IC) chip.

Further, the hardware configuration of these various processors is, more specifically, an electric circuit (circuitry) in which circuit elements, such as semiconductor elements, are combined.

In addition, the method according to the embodiment of the present invention can be implemented, for example, by a program for causing a computer to execute each of the steps thereof. In addition, a computer-readable recording medium on which the program is recorded can be provided.

Although the present invention is described in detail above, the present invention is not limited to the embodiment described above, and it is needless to say that various improvements or changes may be made without departing from the gist of the present invention.

EXPLANATION OF REFERENCES

10: tagging apparatus
12: digital data acquisition unit
14: audio data acquisition unit
16: audio data storage unit (audio data memory)
18: word/phrase extraction unit
tag candidate storage unit (tag candidate memory)
22: tag candidate determination unit
24: tag assignment unit
26: image analysis unit
30: positional information acquisition unit
32: display unit (display)
34: display control unit
36: instruction acquisition unit
40: image
42: information on imaging date and time
44: list of tags
46: text display region
48: "OK" button
50: "finish" button
52: voice input button
54: text
56: window screen (pop-up screen)

What is claimed is:

1. A digital data tagging apparatus comprising:
a processor; and
a tag candidate memory that stores a plurality of tag candidates in advance,
wherein the processor is configured to:
acquire digital data to which a tag is assigned;
acquire audio data related to the digital data;
extract a word/phrase from the audio data;
determine one or more tag candidates of which a degree of association with the word/phrase is equal to or more than a first threshold value from among the plurality of tag candidates as a first tag candidate; and
assign at least one of a tag candidate group including the word/phrase and the first tag candidate to the digital data as the tag,
wherein the digital data is image data, and
wherein the processor is configured to:
recognize a subject included in an image corresponding to the image data;
determine a word/phrase, which represents a name of the subject corresponding to the word/phrase and is different from the word/phrase, as a second tag candidate; and
display the second tag candidate on the display by including the second tag candidate in the tag candidate group.

2. The digital data tagging apparatus according to claim 1, further comprising:
a display,
wherein the processor is configured to:
convert the audio data into text data to extract one or more words/phrases from the text data;
display a text corresponding to the text data on the display;
determine the first tag candidate based on a word/phrase selected by a user from among the one or more words/phrases included in the text displayed on the display;
display the tag candidate group on the display; and
assign at least one selected by the user from the tag candidate group displayed on the display to the digital data as the tag.

3. The digital data tagging apparatus according to claim 2, wherein the processor is configured to include a first synonym of which a degree of similarity in pronunciation to the word/phrase is equal to or more than the first threshold value among synonyms of the word/phrase in the first tag candidate.

4. The digital data tagging apparatus according to claim 2, wherein the processor is configured to include a second synonym of which a degree of similarity in meaning to the word/phrase is equal to or more than the first threshold value among synonyms of the word/phrase in the first tag candidate.

5. The digital data tagging apparatus according to claim 2, wherein the processor is configured to include a first synonym of which a degree of similarity in pronunciation to the word/phrase is equal to or more than the first threshold value and a second synonym of which a degree of similarity in meaning to the word/phrase is equal to or more than the first threshold value among synonyms of the word/phrase in the first tag candidate.

6. The digital data tagging apparatus according to claim 5, wherein the processor is configured to determine the number of the first synonyms and the number of the second synonyms to be included in the first tag candidate such that the number of the first synonyms is larger than the number of the second synonyms.

7. The digital data tagging apparatus according to claim 2, wherein the processor is configured to include a homonym of the word/phrase in the first tag candidate.

8. The digital data tagging apparatus according to claim 2, wherein the processor is configured to display a word/phrase or a tag candidate, which is previously selected by the user, from the tag candidate group with higher priority than a word/phrase or a tag candidate, which is not previously selected by the user.

9. The digital data tagging apparatus according to claim 8, wherein the processor is configured to display a word/phrase or a tag candidate, which is previously selected many times, among the words/phrases or the tag candidates, which are previously selected by the user, with higher priority than a word/phrase or a tag candidate, which is previously selected few times.

10. The digital data tagging apparatus according to claim 2,
wherein the processor is configured to:
acquire information on an imaging position of an image corresponding to the image data;

determine a tag candidate, which represents a place name that is located within a range equal to or less than a fourth threshold value from the imaging position of the image and has a degree of similarity of pronunciation to the word/phrase being equal to or more than a third threshold value, from among the plurality of tag candidates as a fifth tag candidate based on the information on the imaging position of the image; and display the fifth tag candidate on the display by including the fifth tag candidate in the tag candidate group.

11. The digital data tagging apparatus according to claim 2, wherein the processor is configured to:

extract a place name from audio data including the place name;

in a case in which there are a plurality of locations of the place name, determine a tag candidate consisting of a combination of the place name and each of the plurality of locations as an eighth tag candidate; and display the eighth tag candidate on the display by including the eighth tag candidate in the tag candidate group.

12. The digital data tagging apparatus according to claim 2, wherein the processor is configured to:

extract at least one of a sound onomatopoeic word or a voice onomatopoeic word corresponding to an environmental sound included in the audio data from the audio data;

determine at least one of the sound onomatopoeic word or the voice onomatopoeia word as a ninth tag candidate; and display the ninth tag candidate on the display by including the ninth tag candidate in the tag candidate group.

13. The digital data tagging apparatus according to claim 1, further comprising:

an audio data memory that stores the audio data, wherein the processor is configured to store the audio data having information on association with the digital data in the audio data memory.

14. The digital data tagging apparatus according to claim 1, wherein the digital data is moving image data, and the processor is configured to extract the word/phrase from audio data included in the moving image data.

15. A digital data tagging apparatus comprising:

a processor;

a display; and a tag candidate memory that stores a plurality of tag candidates in advance, wherein the processor is configured to:

acquire digital data to which a tag is assigned;

acquire audio data related to the digital data;

extract a word/phrase from the audio data;

determine one or more tag candidates of which a degree of association with the word/phrase is equal to or more than a first threshold value from among the plurality of tag candidates as a first tag candidate; and assign at least one of a tag candidate group including the word/phrase and the first tag candidate to the digital data as the tag, wherein the processor is configured to:

convert the audio data into text data to extract one or more words/phrases from the text data;

display a text corresponding to the text data on the display;

determine the first tag candidate based on a word/phrase selected by a user from among the one or more words/phrases included in the text displayed on the display;

display the tag candidate group on the display; and assign at least one selected by the user from the tag candidate group displayed on the display to the digital data as the tag, wherein the digital data is image data, and wherein the processor is configured to:

recognize at least one of a subject or a scene included in an image corresponding to the image data; and in a case in which there are a predetermined number or more of the tag candidates of which the degree of association with the word/phrase is equal to or more than the first threshold value among the plurality of tag candidates, determine only a tag candidate of which a degree of association with at least one of the subject or the scene is equal to or more than a second threshold value from among the predetermined number or more of the tag candidates as the first tag candidate.

16. A digital data tagging apparatus comprising:

a processor;

a display; and a tag candidate memory that stores a plurality of tag candidates in advance, wherein the processor is configured to:

acquire digital data to which a tag is assigned;

acquire audio data related to the digital data;

extract a word/phrase from the audio data;

determine one or more tag candidates of which a degree of association with the word/phrase is equal to or more than a first threshold value from among the plurality of tag candidates as a first tag candidate; and assign at least one of a tag candidate group including the word/phrase and the first tag candidate to the digital data as the tag, wherein the processor is configured to:

convert the audio data into text data to extract one or more words/phrases from the text data;

display a text corresponding to the text data on the display;

determine the first tag candidate based on a word/phrase selected by a user from among the one or more words/phrases included in the text displayed on the display;

display the tag candidate group on the display; and assign at least one selected by the user from the tag candidate group displayed on the display to the digital data as the tag, wherein the digital data is image data, and wherein the processor is configured to:

recognize at least one of a subject or a scene included in an image corresponding to the image data;

determine a tag candidate of which a degree of association with at least one of the subject or the scene is equal to or more than a second threshold value and a degree of similarity of pronunciation to the word/phrase is equal to or more than a third threshold value, from among the plurality of tag candidates as a third tag candidate; and display the third tag candidate on the display by including the third tag candidate in the tag candidate group.

17. A digital data tagging apparatus comprising:
a processor;
a display; and
a tag candidate memory that stores a plurality of tag candidates in advance,
wherein the processor is configured to:
acquire digital data to which a tag is assigned;
acquire audio data related to the digital data;
extract a word/phrase from the audio data;
determine one or more tag candidates of which a degree of association with the word/phrase is equal to or more than a first threshold value from among the plurality of tag candidates as a first tag candidate; and
assign at least one of a tag candidate group including the word/phrase and the first tag candidate to the digital data as the tag,
wherein the processor is configured to:
convert the audio data into text data to extract one or more words/phrases from the text data;
display a text corresponding to the text data on the display;
determine the first tag candidate based on a word/phrase selected by a user from among the one or more words/phrases included in the text displayed on the display;
display the tag candidate group on the display; and
assign at least one selected by the user from the tag candidate group displayed on the display to the digital data as the tag,
wherein the digital data is image data, and a person tag, which represents a name of a subject included in an image corresponding to the image data, is assigned to the image data by a first user, and
wherein the processor is configured to:
recognize the subject included in the image;
extract the name of the subject from audio data including a voice of a second user who is different from the first user and utters the name of the subject for the image;
determine one or more tag candidates of which a degree of association with the name of the subject is equal to or more than the first threshold value as the first tag candidate to determine the person tag as a fourth tag candidate in a case in which the first tag candidate and the person tag are different from each other; and
display the fourth tag candidate on the display by including the fourth tag candidate in the tag candidate group.

18. A digital data tagging apparatus according to claim 2, comprising:
a processor;
a display; and
a tag candidate memory that stores a plurality of tag candidates in advance,
wherein the processor is configured to:
acquire digital data to which a tag is assigned;
acquire audio data related to the digital data;
extract a word/phrase from the audio data;
determine one or more tag candidates of which a degree of association with the word/phrase is equal to or more than a first threshold value from among the plurality of tag candidates as a first tag candidate; and
assign at least one of a tag candidate group including the word/phrase and the first tag candidate to the digital data as the tag,
wherein the processor is configured to:
convert the audio data into text data to extract one or more words/phrases from the text data;
display a text corresponding to the text data on the display;
determine the first tag candidate based on a word/phrase selected by a user from among the one or more words/phrases included in the text displayed on the display;
display the tag candidate group on the display; and
assign at least one selected by the user from the tag candidate group displayed on the display to the digital data as the tag,
wherein the digital data is image data, and
wherein the processor is configured to:
recognize a subject included in an image corresponding to the image data;
acquire information on an imaging position of the image;
extract a name of the subject from audio data including the name of the subject included in the image;
in a case in which the name of the subject and an actual name of the subject located within a range equal to or less than a fourth threshold value from the imaging position of the image are different from each other, determine the actual name of the subject as a sixth tag candidate based on the information on the imaging position of the image; and
display the sixth tag candidate on the display by including the sixth tag candidate in the tag candidate group.

19. The digital data tagging apparatus according to claim 18,
wherein the processor is configured to:
in a case in which the sixth tag candidate is selected by the user from the tag candidate group including the sixth tag candidate displayed on the display for one image data, for each of a plurality of image data corresponding to a plurality of images captured within a predetermined period, determine an actual name corresponding to a subject included in each of the plurality of images as a seventh tag candidate; and
assign the seventh tag candidate corresponding to each of the plurality of image data to each of the plurality of image data as the tag.

20. A digital data tagging method comprising:
acquiring digital data to which a tag is assigned via a processor;
acquiring audio data related to the digital data via the processor;
extracting a word/phrase from the audio data via the processor;
determining one or more tag candidates of which a degree of association with the word/phrase is equal to or more than a first threshold value from among a plurality of tag candidates, which are stored in advance in a tag candidate storage unit, as a first tag candidate via the processor; and
assigning at least one of a tag candidate group including the word/phrase and the first tag candidate to the digital data as the tag via the processor,
wherein the digital data is image data,
the digital data tagging method further comprising:

recognizing a subject included in an image corresponding to the image data via the processor;

determining a word/phrase, which represents a name of the subject corresponding to the word/phrase and is different from the word/phrase, as a second tag candidate via the processor; and displaying the second tag candidate on the display by including the second tag candidate in the tag candidate group via the processor.

21. A non-transitory computer-readable recording medium on which a program for causing a computer to execute each of the steps of the digital data tagging method according to claim 20 is recorded.

* * * * *